(12) United States Patent
Reese et al.

(10) Patent No.: US 9,778,010 B2
(45) Date of Patent: Oct. 3, 2017

(54) RETRACTABLE TAPE MEASURE AND SECURING SAME

(71) Applicant: Sears Brands, L.L.C., Hoffman Estates, IL (US)

(72) Inventors: Brian Todd Reese, St. Charles, IL (US); Cody Lyle Mayer, Chicago, IL (US)

(73) Assignee: SEARS BRANDS, L.L.C., Hoffman Estates, IL (US)

( * ) Notice: Subject to any disclaimer, the term of this patent is extended or adjusted under 35 U.S.C. 154(b) by 66 days.

(21) Appl. No.: 14/840,893

(22) Filed: Aug. 31, 2015

(65) Prior Publication Data

US 2017/0059294 A1 Mar. 2, 2017

(51) Int. Cl.
*G01B 3/10* (2006.01)

(52) U.S. Cl.
CPC .... *G01B 3/1041* (2013.01); *G01B 2003/1048* (2013.01)

(58) Field of Classification Search
CPC .............................. G01B 3/10; G01B 3/1041
USPC .................................................... 33/758–761
See application file for complete search history.

(56) References Cited

U.S. PATENT DOCUMENTS

| | | | |
|---|---|---|---|
| 1,434,528 A | 11/1922 | Crogan | |
| 2,776,448 A | 1/1957 | Trammell, Jr. | |
| 4,281,461 A * | 8/1981 | Roe | G01B 3/1084 33/760 |
| 4,542,589 A * | 9/1985 | Yamamoto | G01B 3/1084 33/18.1 |
| 4,924,597 A * | 5/1990 | Tursi | G01B 3/1071 33/758 |
| 5,253,421 A * | 10/1993 | Landmark | B43L 9/04 33/27.03 |
| 5,333,391 A * | 8/1994 | Eldridge | A01G 1/08 33/1 H |
| 5,809,661 A * | 9/1998 | Brown | G01B 3/1071 33/755 |
| 5,845,412 A | 12/1998 | Arcand | |
| 7,107,700 B2 | 9/2006 | Lewis et al. | |
| 7,251,904 B2 | 8/2007 | Lewis et al. | |

(Continued)

FOREIGN PATENT DOCUMENTS

| | | |
|---|---|---|
| DE | 1180956 | 11/1964 |
| EP | 1553382 | 7/2005 |

OTHER PUBLICATIONS

"Milwaukee Introduces New Tape Measures Ideal for Layout", Milwaukee Tool, dated Jan. 12, 2015, 2 pages.

(Continued)

*Primary Examiner* — Yaritza Guadalupe-McCall
(74) *Attorney, Agent, or Firm* — McAndrews, Held & Malloy, Ltd.

(57) ABSTRACT

Various tape measures and devices for stabilizing and securing such tape measures during use are described. Some tape measures may include a tang that extends from a back side of the tape measure. The extended tang may secure the tape measure to the object being measured. The tang may further provide lateral stabilization. Some tape measures may include a horizontal reel that lowers the center of gravity and increases stability of the tape measure. Further tape measures may incorporate extendable stabilizers that increase an effective width of the tape measure and thus its lateral stability during use.

19 Claims, 12 Drawing Sheets

(56) References Cited

U.S. PATENT DOCUMENTS

| | | | |
|---|---|---|---|
| 2003/0037454 A1* | 2/2003 | Reed | G01B 3/1041 |
| | | | 33/761 |
| 2008/0066333 A1 | 3/2008 | Hernandez | |
| 2009/0038172 A1 | 2/2009 | Caldi | |
| 2014/0109417 A1 | 4/2014 | Kocenko | |
| 2015/0107128 A1 | 4/2015 | Kar Ho Samuel | |
| 2016/0069658 A1* | 3/2016 | Klein | G01B 3/004 |
| | | | 33/760 |
| 2017/0059294 A1* | 3/2017 | Reese | G01B 3/1041 |

OTHER PUBLICATIONS

Extended European Search Report for EP16186661, dated Nov. 10, 2016, (5 pages).

* cited by examiner

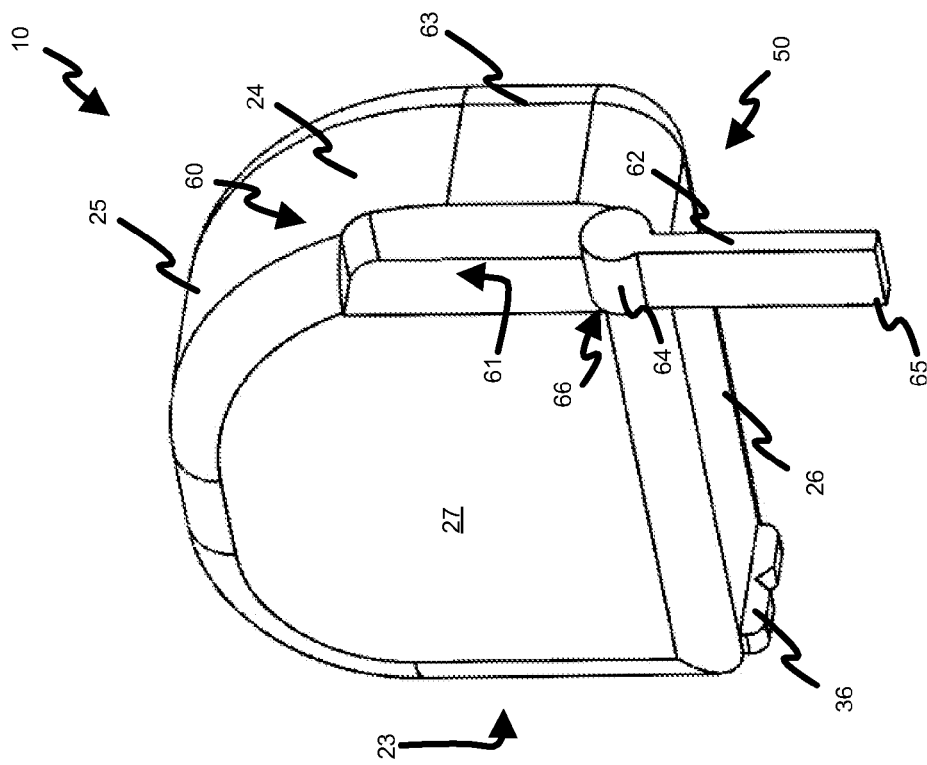
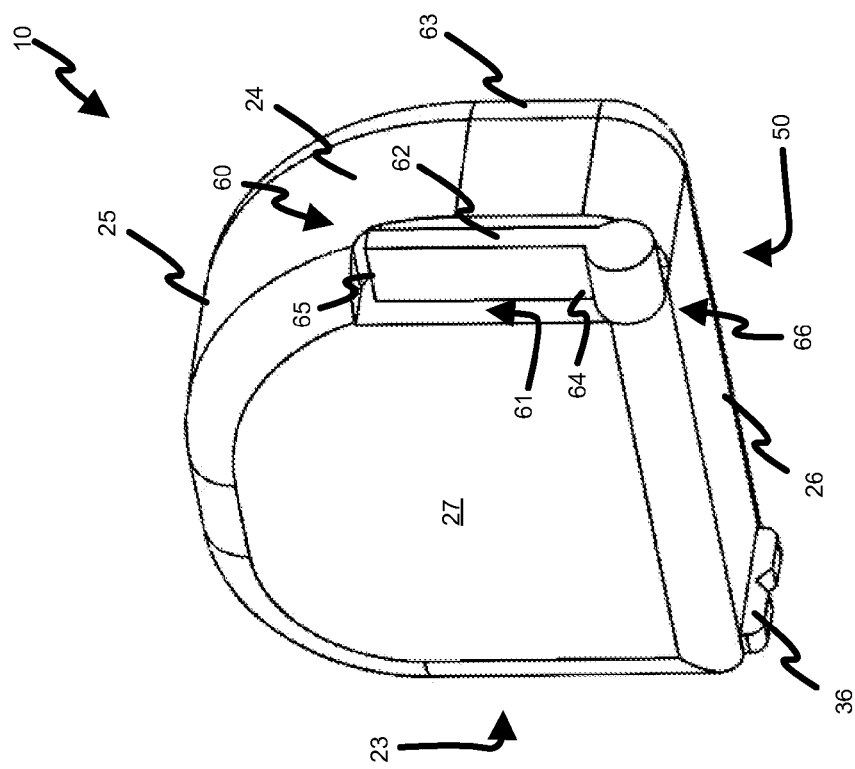

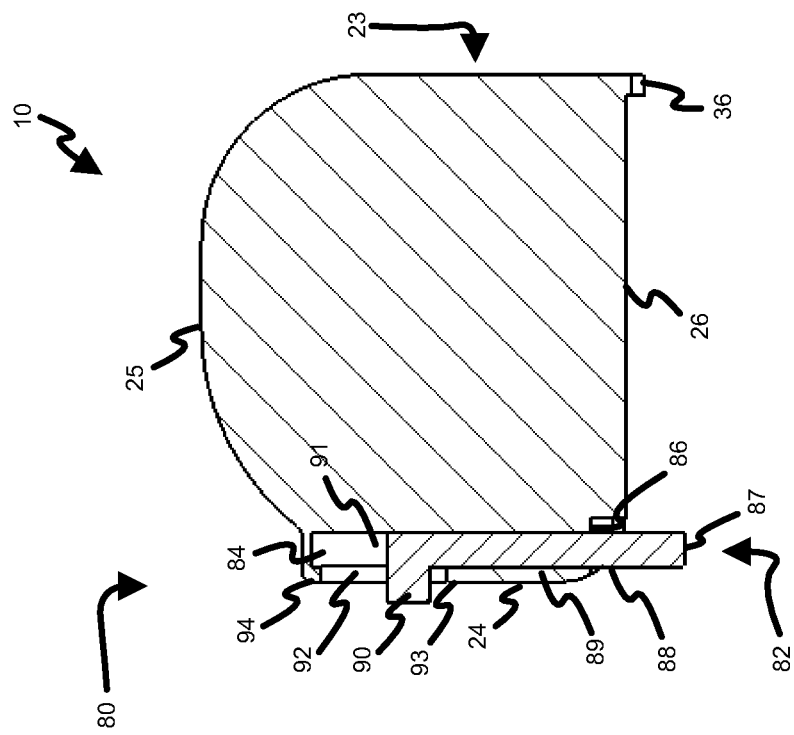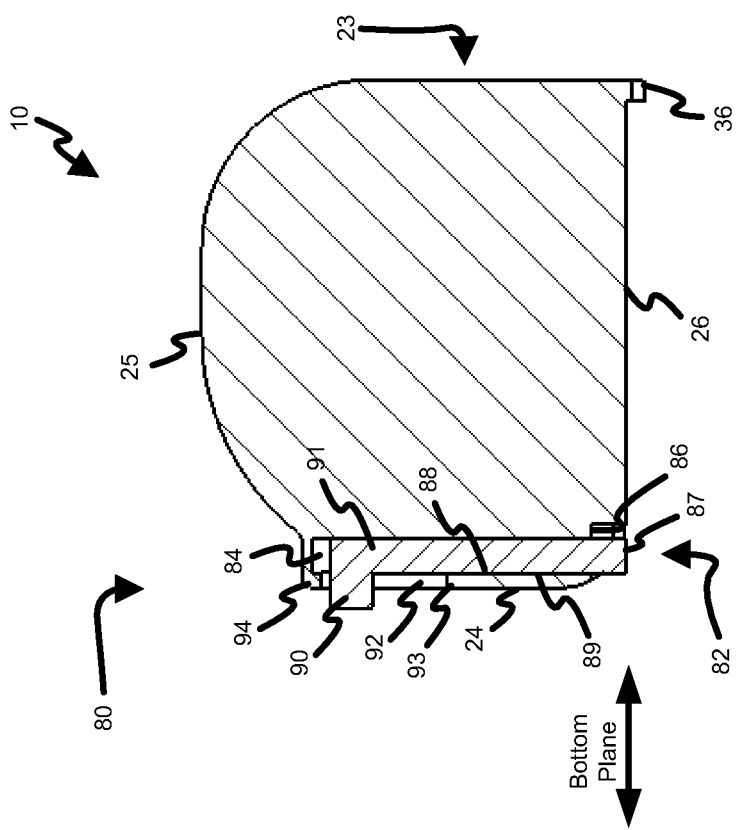

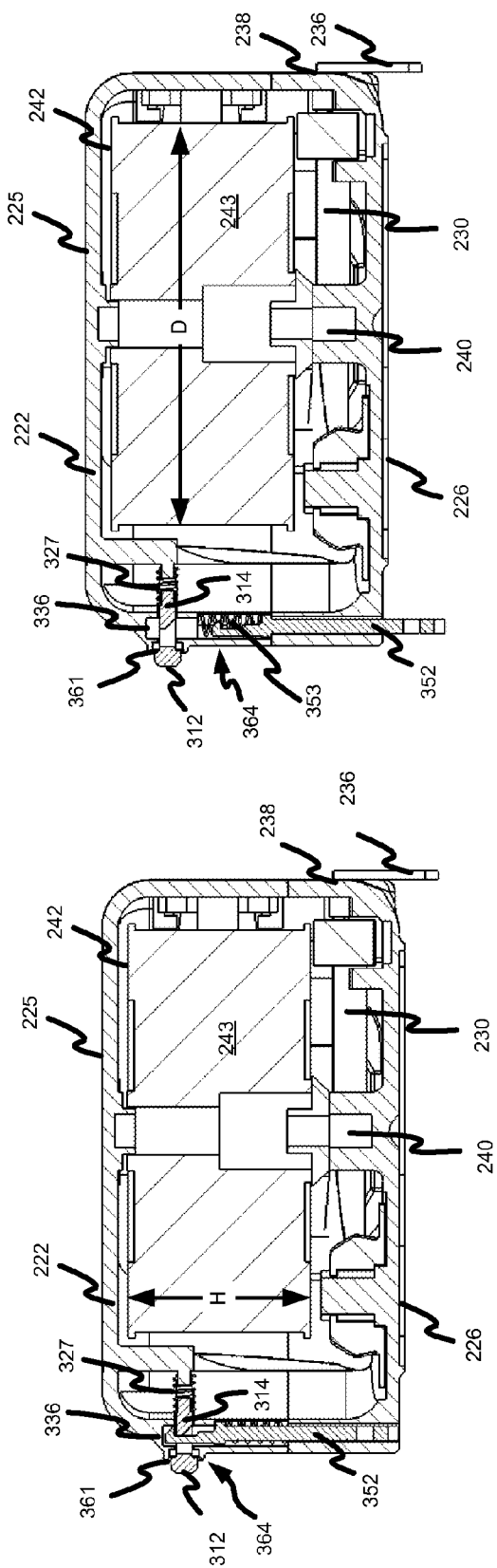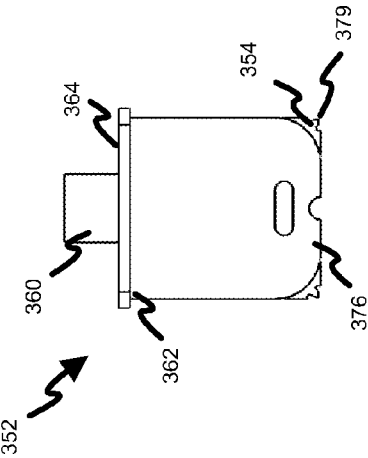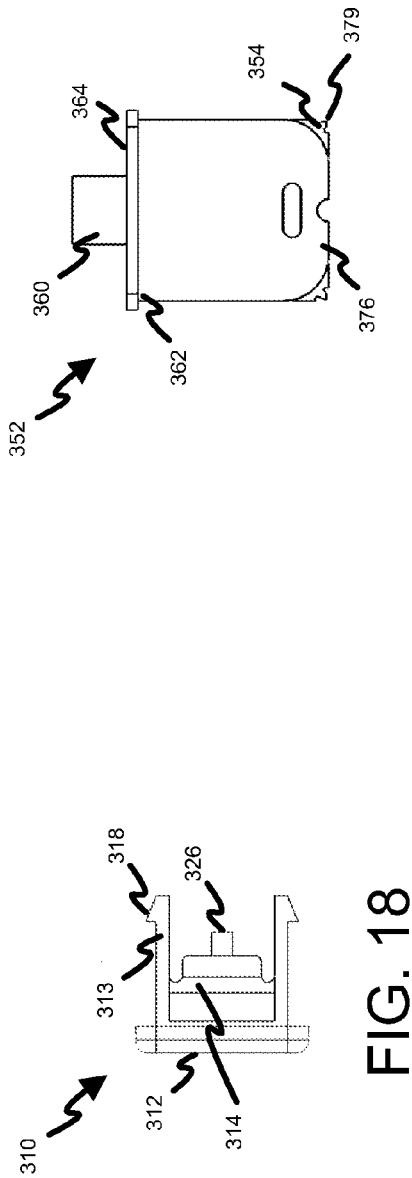
FIG. 17
FIG. 19
FIG. 16
FIG. 18

RETRACTABLE TAPE MEASURE AND SECURING SAME

FIELD OF THE INVENTION

Various embodiments relate to a retractable tape measure, and more particularly, to enhancements for securing or stabilizing a retractable tape measure during use.

BACKGROUND OF THE INVENTION

A retractable tape measure may include a body, a tape reel, and a measuring tape blade. The body houses the reel and at least a portion of the measuring tape blade that is wound around the reel. The body further includes a slot through which a distal end of measuring tape blade extends from the body. A tab or hook may be affixed to the distal end of the measuring tape blade. The tab may permit the distal end of the measuring tape blade to be secured to an object.

Such a retractable tape measure may permit a craftsperson to measure objects having dimensions that far exceed the wingspan of the craftsperson. For example, the craftsperson may secure the tab to one end of an object and carry the tape measure to the other end of the object. Assuming the tab remains secured to the object, moving the tape measure to the other end of the object will cause the measuring tape blade to be unwound from the reel and further extended from the body. The craftsperson may then view measurement markings on the measuring tape blade to determine the length of the extended measuring tape blade and therefore the length of the object being measured.

Alternatively, the craftsperson may place the body of the tape measure at one end of the object and carry the distal end of the measuring tape blade to the other end of the object. Assuming the body remains at the end of the object, moving the distal end of the measuring tape blade causes the measuring tape blade to be unwound from the reel and further extended from the body. The craftsperson may then view measurement markings on the measuring tape blade to determine the length of the extended measuring tape blade and therefore the length of the object being measured.

Regardless of which approach the craftsperson chooses, the tape body and the distal end of the measuring tape blade must remain in position in order for the craftsperson to obtain an accurate measure. Unfortunately, existing tape bodies and distal ends commonly do not remain in position throughout the measuring process. As such, a craftsperson may be required to repeat the process or enlist the aid of a colleague to hold one end of the retractable measuring tape blade in order to obtain an accurate measure.

Limitations and disadvantages of conventional and traditional approaches should become apparent to one of skill in the art, through comparison of such systems with aspects of the present invention as set forth in the remainder of the present application.

BRIEF SUMMARY OF THE INVENTION

Tape measures and manners of securing or stabilizing such tape measures during use are substantially shown in and/or described in connection with at least one of the figures, and are set forth more completely in the claims.

Advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

FIGS. 2 and 3 show a securing assembly for a tape measure.

FIGS. 4-7 show another securing assembly for use with a tape measure.

FIGS. 14-19 show a horizontal-reel tape measure and another securing assembly for a tape measure.

DETAILED DESCRIPTION OF THE INVENTION

Aspects of the present invention are generally related to retractable tape measures. More specifically, certain embodiments of the present invention relate to securing or stabilizing a retractable tape measure when measuring an object. Such securing or stabilizing of a retractable tape measure may help a craftsperson to measure an object that is longer than the craftsperson's wingspan without enlisting the aid of another person.

Figure 1:
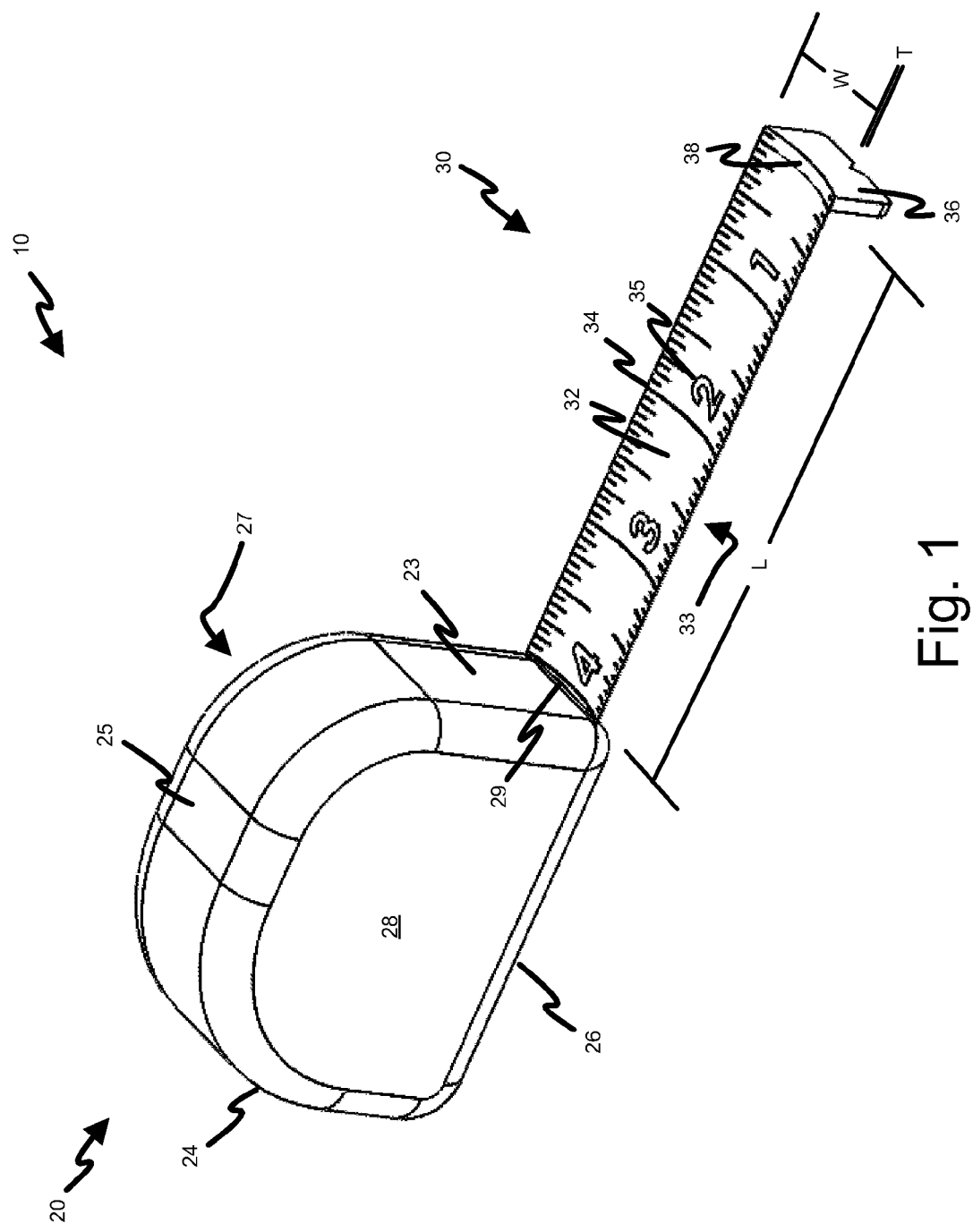
FIG. 1 shows a tape measure in accordance with an embodiment of the present invention.
Figure 5:
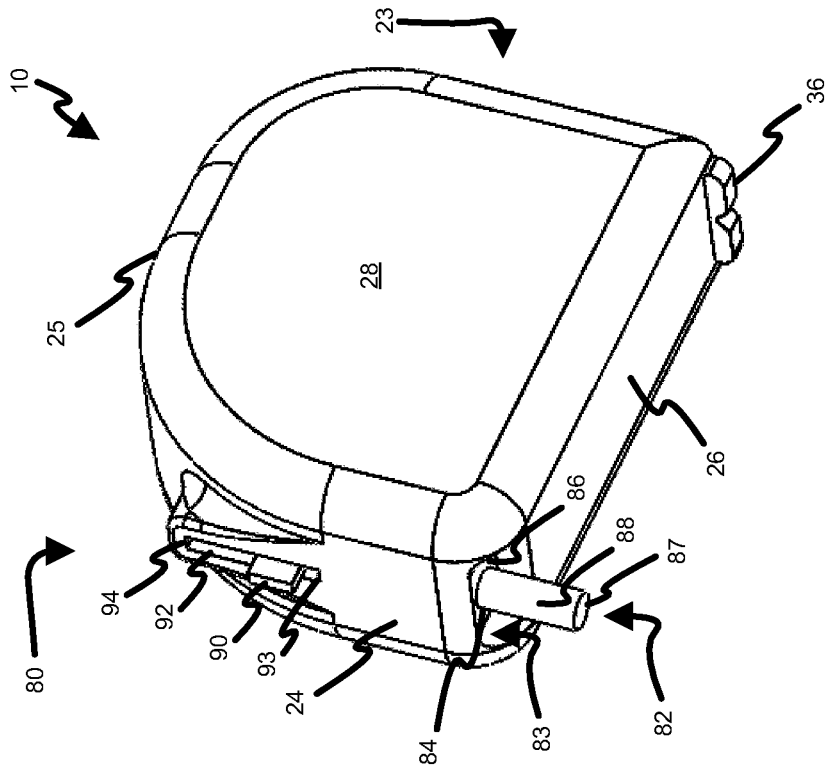
Figure 4:
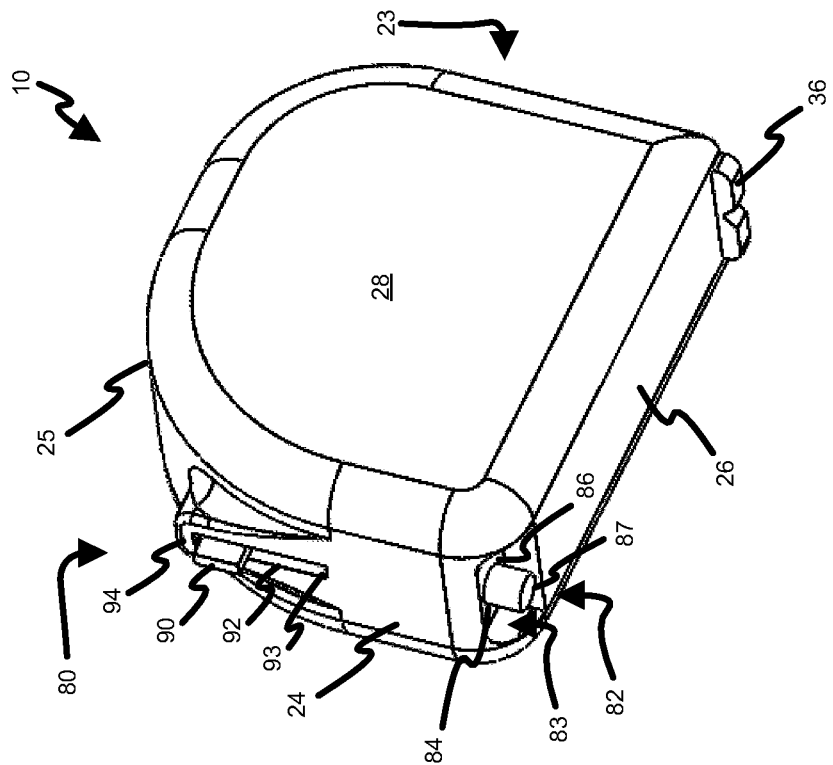

Referring now to FIG. 1, a vertical-reel, retractable tape measure 10 is shown. The tape measure 10 may include an outer casing or housing 20 defined by one or more outer walls. The casing 20 may generally define a front side 23, a back side 24 opposite the front side 23, a top side 25, a bottom side 26 opposite the top side 25, a left side 27, and a right side 28 opposite the left side 27 of the retractable tape measure 10. The tape measure 10 may further include a measuring tape blade 30 that extends through a horizontal slot 29 in the front side 23 of the casing 20.

The blade 30 may comprise a long, narrow strip of metal or other flexible material such as, for example, cloth, plastic, or fiber glass. The blade 30 may have a long length L (e.g., 25 feet), a narrow width W (e.g., 1 inch), and a minor thickness T (e.g., 0.1 millimeters) that define a major upper surface 32 and a major lower surface 33 of the blade 30. The blade 30 may further include measurement markings 34 on the upper surface 32, the lower surface 33, or both. The markings 34 may be spaced at regular intervals (e.g., every sixteenth of an inch) and may have associated labels 35 to assist a craftsperson in obtaining a measurement reading.

The blade 30 may further include a hook or tab 36 that is attached to a distal end 38. A craftsperson may use the tab 36 to secure the distal end 38 of the blade 30 to an object to be measured. Moreover, the tab 36 may be dimensioned such that the tab 36 is too large to pass through the slot 29 in the front side 23 of the casing 20. Such dimensioning of the slot 29 and hook 36 ensures that a spring-loaded reel (described below) does not retract the distal end 38 of the blade 30 into an interior of the casing 20.

As explained in detail below, the back side 24 of the tape measure 10 may include one or more securing assemblies (obscured in FIG. 1).

Referring now to FIGS. 2 and 3, the retractable tape measure 10 is shown with a securing assembly 50. As shown, the securing assembly 50 may comprise a retractable member 60 that may be pivoted between a retracted position (e.g., FIG. 2) and an extended position (e.g., FIG. 3). The casing 20 may include a recess 61 sized to receive the retractable member 60 when rotated from the extended position to the retracted position and to permit rotation of the retractable member 60 from the retracted position to the extended position. As shown, the recess 61 may extend along a lower portion of the left, back edge of the casing 20. Alternatively, the recess 61 may extend along a lower portion of the right, back edge 63 of the casing 20. Further still, the securing assembly 50 may include two retractable members 60, one associated with the left, back edge and another associated with the right, back edge 63.

The retractable member 60 may comprise a lever or bar 62 having a proximal end 64 and a distal end 65. The proximal end 64 may include a pivotal coupling 66 associated with the left, back edge of the casing 20. In particular, the pivotal coupling 66 may define an axis of rotation that is normal to the back side 24 and that permits proximal end 64 of the bar 62 to be rotated in a clockwise and counterclockwise manner about the axis. In some embodiments, the recess 61 is sized to prevent over rotation of the lever 62 when moving from the extended position to the retracted position or from the retracted position to the extended position. In other embodiments, the casing 20 and pivotal coupling 66 may further may include stops, detents, or both that interact with one another to prevent over-rotation or to provide a resistive force that holds the lever 62 in the retracted position and the extended position till overcome by an external force (e.g., a craftsperson manually rotating the lever 62 between positions).

When in the extended position, the distal end 65 of the lever 62 extends through a plane defined by the bottom side 24 of the casing. Thus, when in the extended position, the lever 62 may engage an edge of an object (e.g., a wooden board) to be measured. By engaging the object, the lever 62 may help secure the tape measure 10 to the object and may help hold the tape measure 10 in place while a craftsperson extracts the measuring tape blade 30 from the front side 23. Such securing of the back side 24 of the tape measure 10 to the object via the lever 62 is especially helpful when the dimension to be measured exceeds the craftsperson's wingspan.

Referring now to FIGS. 4-7, the retractable tape measure 10 is shown with a securing assembly 80. As shown, the securing assembly 80 may comprise a retractable member in the form of a cylindrical post 82 that may be moved between a retracted position (e.g., FIG. 4) and an extended position (e.g., FIG. 5). The casing 20 may include a recess 83 and an opening or bore 84. The recess 83 may extend along a bottom, back edge of the casing 20 thus forming a bottom surface 86 that is raised above the bottom side 26 of the casing 20. The raised bottom surface 86 permits a distal end 87 of the post 82, when in the retracted position, to extend from the casing 20 but not into a plane defined by the bottom side 26 of the casing 20. However, when in the extended position, the distal end 87 may extend through the plane defined by the bottom side 26 that permitting the back side 24 to be secured to an object via the post 82.

As shown, the bore 84 may extend through the bottom surface 86 of the recess 83. Moreover, an inner surface of the bore 84 may engage an outer, side surface 88 of the post 82 in a manner that permits the outer side surface 88 to slide against the inner surface 89 of the bore 84. In one embodiment, the bore 84 provides a friction-fit sufficient to prevent the post 82 from sliding into the extended position of FIGS. 5 and 7 due to gravity. The back side 24 of the casing 20 further includes a vertical slot or channel 92 that exposes an upper portion of the bore 84. The channel 92 may receive a tab 90 that is coupled to a proximal end 91 of the post 82. In particular, the tab 90 may extend through the back side 24 via the channel 92 to provide a lever that projects outward from the back side 24. A craftsperson may apply a force to the tab 90 to move the post 82. By pushing down on the tab 90 toward the bottom side 26 of casing 20, a craftsperson may exert a force sufficient to overcome the friction-fit and cause the post 82 to slide into the extended position of FIGS. 5 and 7. Conversely, by pushing up on the tab 90 toward the top side 25 of the casing 20, a craftsperson may exert a force sufficient to overcome the friction-fit and cause the post 82 to slide into the retracted position of FIGS. 4 and 6.

Furthermore, a lower end 93 and an upper end 94 of the channel 92 may provide stops for the post 82. In particular, the channel 92 may prevent or stop the tab 90 from moving beyond the lower end 93. By stopping the tab 90 at the lower end 93, the channel 92 may prevent the post 82 from being over-extended and completely removed from the casing 20 as the craftsperson manually extends the post 82. Conversely, the channel 92 may prevent or stop the tab 90 from moving beyond the upper end 94. By stopping the tab 90 at the upper end 94, the channel 92 may prevent the post 82 from being over-retracted into the casing 20 as the craftsperson manually retracts the post 82 into the bore 84.

Figure 9:
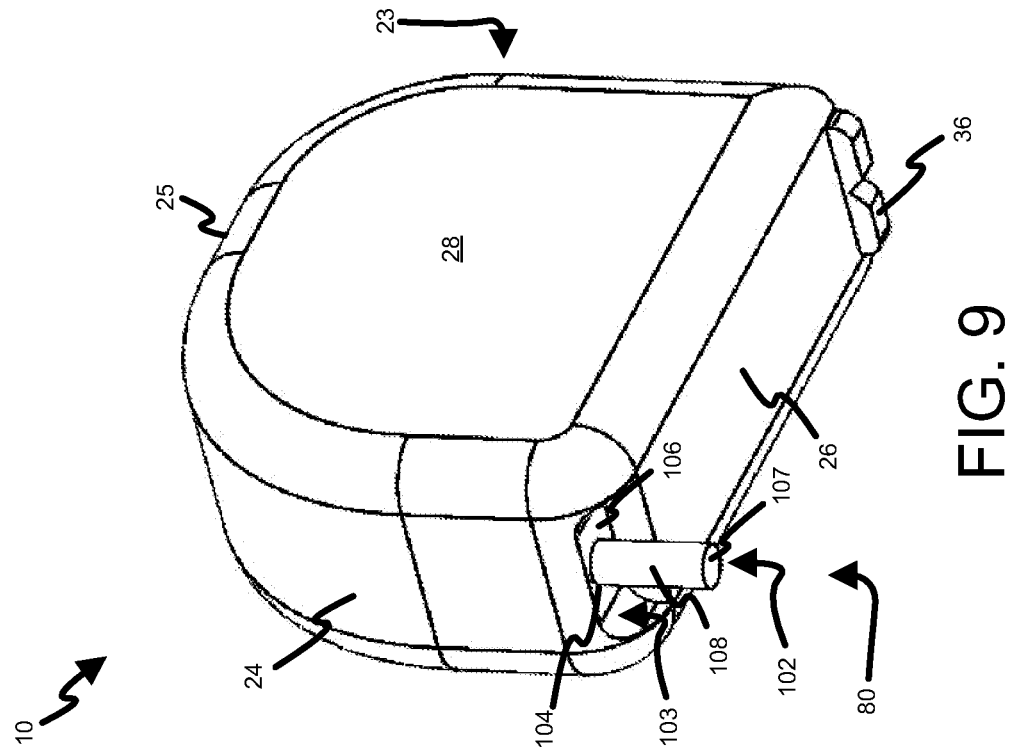
FIGS. 8 and 9 show yet another securing assembly for a tape measure.
Figure 8:
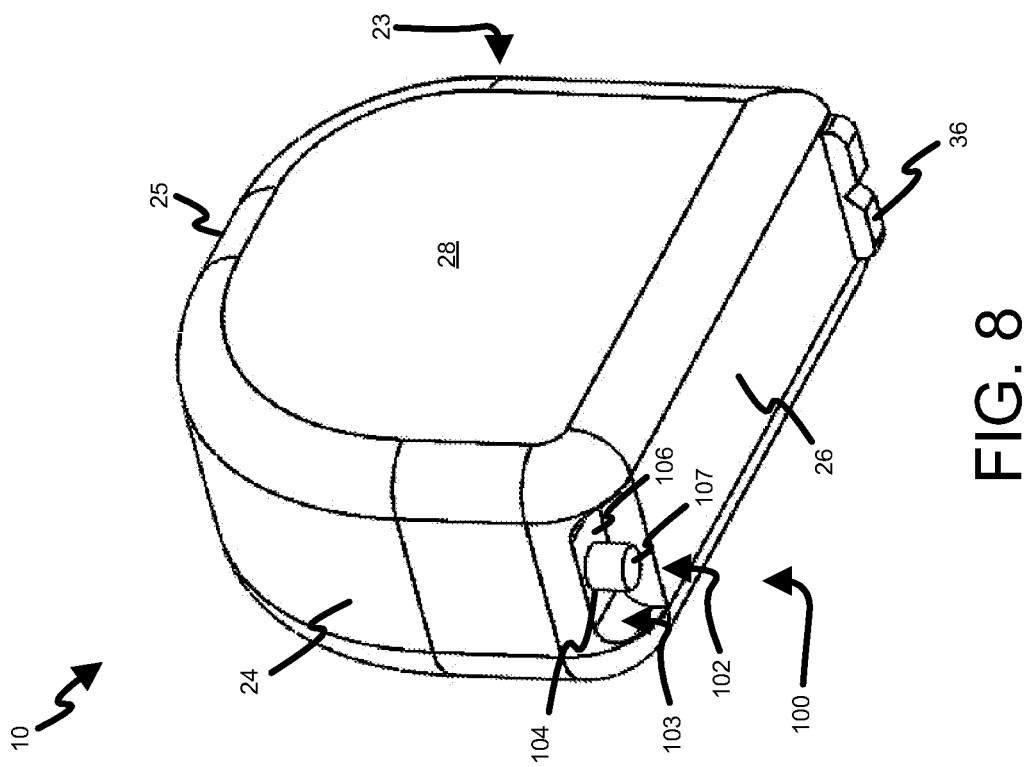

Referring now to FIGS. 8 and 9, the retractable tape measure 10 is shown with a securing assembly 100. As shown, the securing assembly 100 may comprise a retractable member in the form of a cylindrical post 102 that may be moved between a retracted position (e.g., FIG. 8) and an extended position (e.g., FIG. 9). The casing 20 may include a recess 103 and an opening or bore 104. The recess 103 may extend along a bottom, back edge of the casing 20 thus forming a bottom surface 106 that is raised above the bottom side 26 of the casing 20. The raised bottom surface 106 permits a distal end 107 of the post 102, when in the retracted position, to extend from the casing 20 but not into a plane defined by the bottom side 26 of the casing 20. However, when in the extended position, the distal end 107 may extend through the plane defined by the bottom side 26 thus permitting the back side 24 to be secured to an object via the post 102.

As shown, the bore 104 may extend through the bottom surface 106 of the recess 103. Moreover, an inner surface of the bore 104 may engage an outer surface 108 of the post 82 in a manner that permits the outer surface 108 to slide against the inner surface of the bore 104. In one embodiment, the bore 104 provides a friction-fit sufficient to prevent the post 82 from sliding into the extended position of FIG. 9 due to gravity. The recess 103 may be large enough to permit a craftsperson to grab the distal end 107 of the post 102 with their fingers and manually extend the post 102. Moreover, a proximal end of the post 82 may include stops that prevent the post 102 from being over-extended and completely removed from the casing 20 as the craftsperson manually extends the post 102. Similarly, the stops may prevent the post 102 from being over-retracted and completely inserted into the casing 20 as the craftsperson manually retracts the post 102 into the bore 104.

While the post 102 in one embodiment may be manually retracted and extended, the post 102 in another embodiment may be spring loaded. In such an embodiment, the securing assembly 100 may include a spring and latch that operate similar to a pushbutton on/off switch. When in the retracted position of FIG. 8, the craftsperson may push on the distal end 107 of the post 102 to cause the post 102 to retract slightly into the casing 20 and release a catch. With the catch released, the associated spring may move the post 102 into the extended position. The craftsperson may latter push on the distal end 107 to cause the post 102 to retract back into the bore 104 far enough to re-engage the catch and retain the post 102 in the retracted position.

Figure 11:
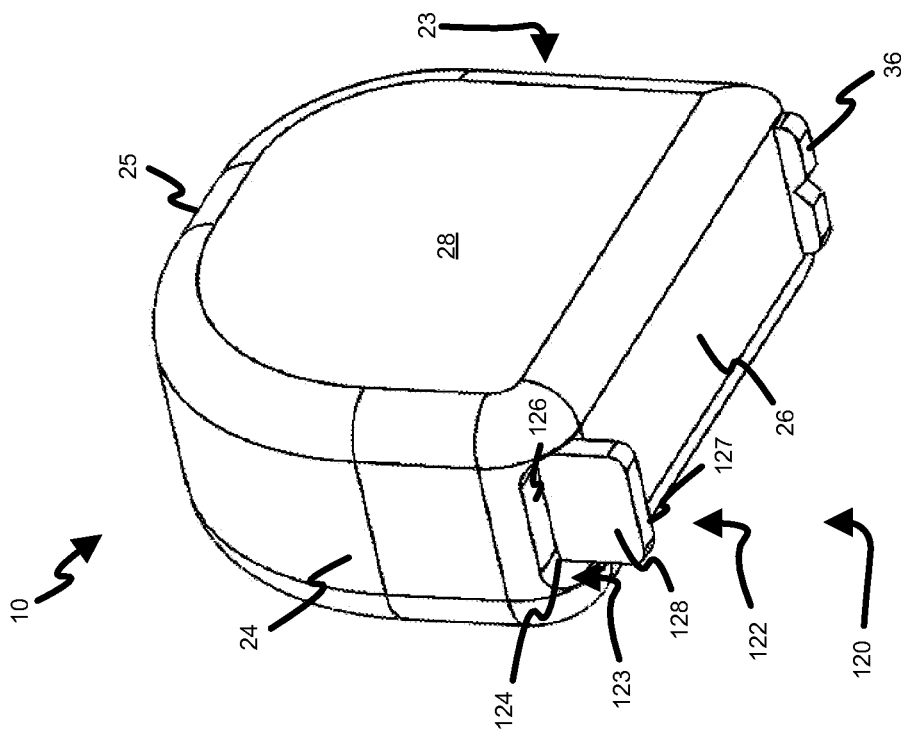
FIGS. 10 and 11 show a further securing assembly for a tape measure.
Figure 10:
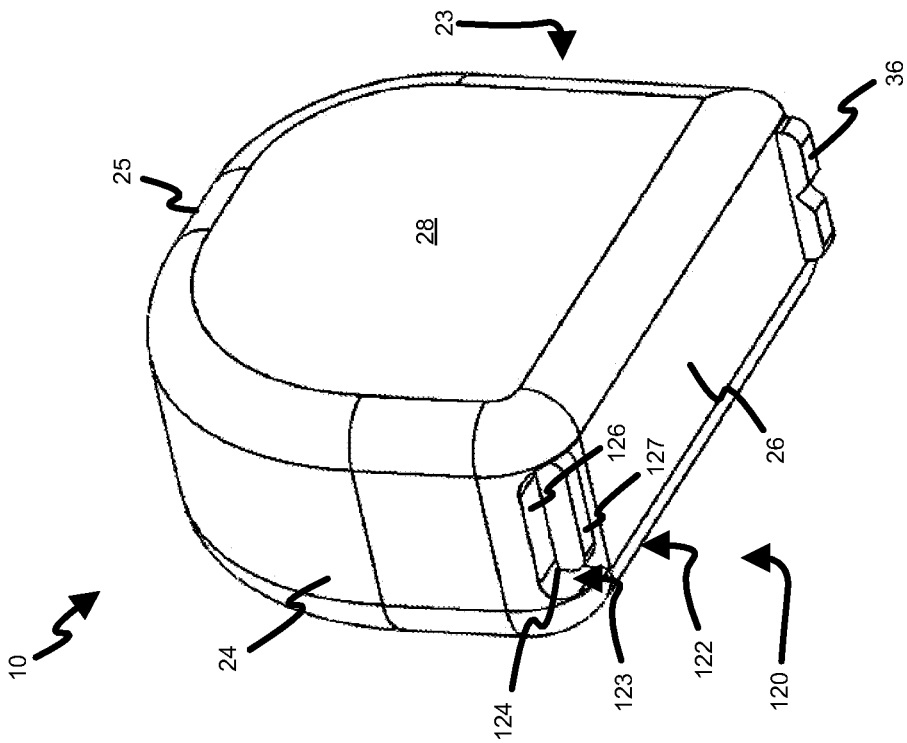

Referring now to FIGS. 10 and 11, the retractable tape measure 10 is shown with a securing assembly 120. As shown, the securing assembly 120 may include a retractable member in the form of a rectangular hook or tab 122 that may be moved between a retracted position (e.g., FIG. 10) and an extended position (e.g., FIG. 11). The casing 20 may include a recess 123 and an opening or slot 124. The recess 123 may extend along a bottom, back edge of the casing 20 thus forming a bottom surface 126 that is raised above the bottom side 26 of the casing 20. The raised bottom surface 126 permits a distal end 127 of the tab 122, when in the retracted position, to extend from the casing 20 but not into a plane defined by the bottom side 26 of the casing 20. However, when in the extended position, the distal end 127 may extend through the plane defined by the bottom side 26 and permit the back side 24 to be secured to an object via the tab 122.

As shown, the slot 124 may extend through the bottom surface 126 of the recess 123. Moreover, inner surfaces of the slot 124 may engage outer surfaces 128 of the tab 122 in a manner that permits the outer surfaces 128 to slide against the inner surfaces of the slot 124. In one embodiment, the slot 124 provides a friction-fit sufficient to prevent the tab 122 from sliding into the extended position of FIG. 11 due to gravity. The recess 123 may be large enough to permit a craftsperson to grab the distal end 127 of the tab 122 with their fingers and manually extend the tab 122. Moreover, a proximal end of the tab 122 may include stops that prevent the tab 122 from being over-extended and completely removed from the casing 20 as the craftsperson manually extends the tab 122. Similarly, the stops may prevent the tab 122 from being over-retracted and completely inserted into the casing 20 as the craftsperson manually retracts the tab 122 into the slot 124.

While the tab 122 in one embodiment may be manually retracted and extended, the tab 122 in another embodiment may be spring loaded. In particular, a craftsperson may push on the distal end 127 of the tab 122 to release a catch and permit an associated spring to move the tab 122 into the extended position. The craftsperson may latter push on the distal end 127 to cause the tab 122 to retract back into the slot 124 far enough to re-engage a catch and retain the tab 122 in the retracted position.

Figure 13:
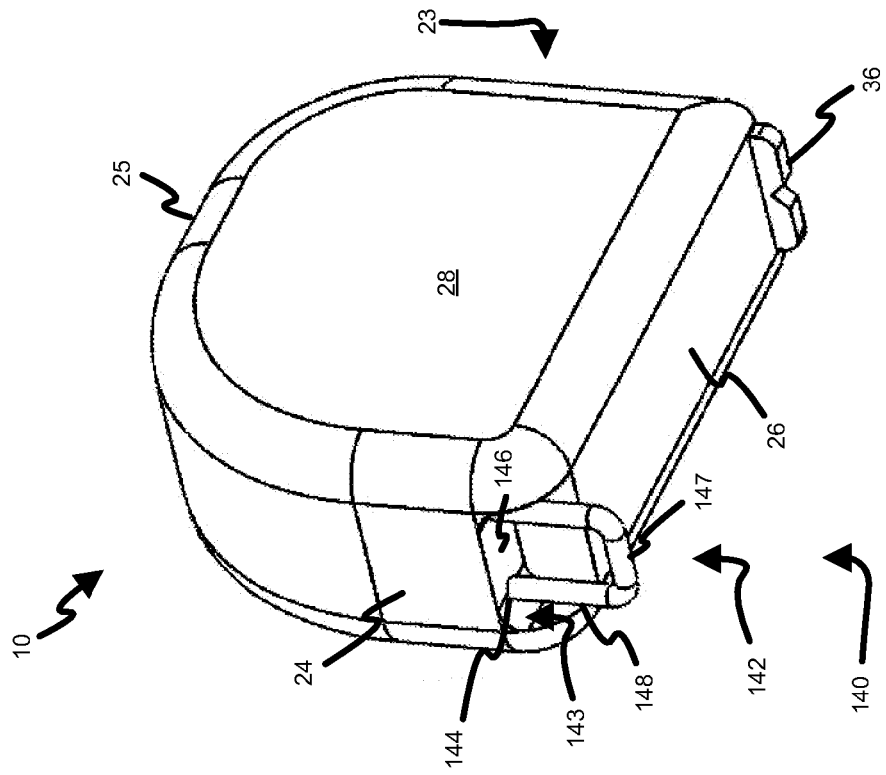
FIGS. 12 and 13 show another securing assembly for a tape measure.
Figure 12:
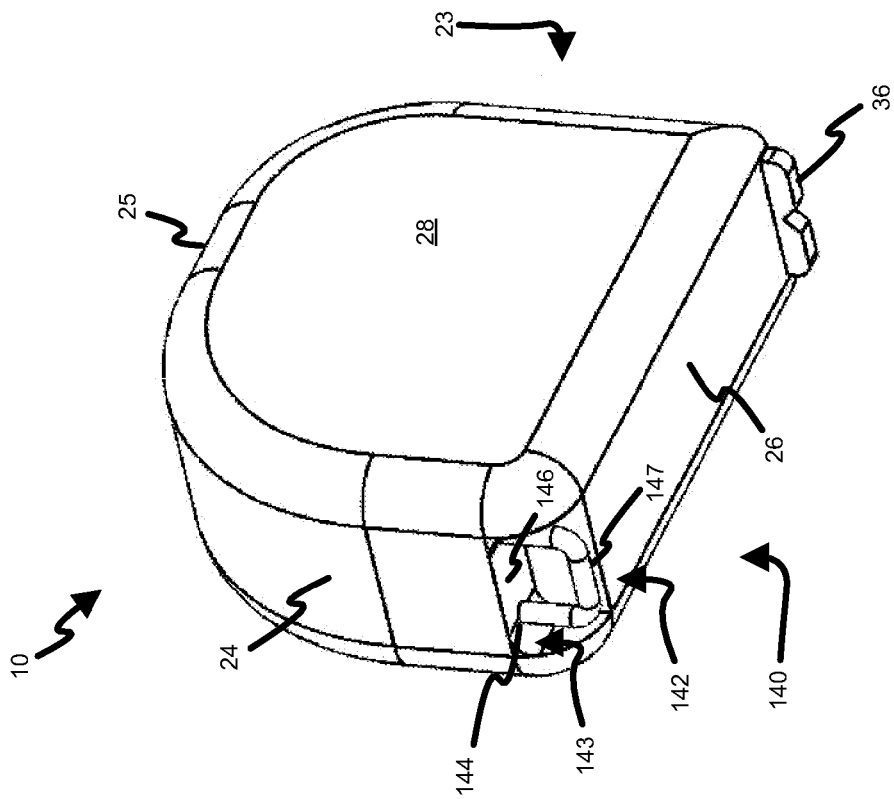
Figure 15:
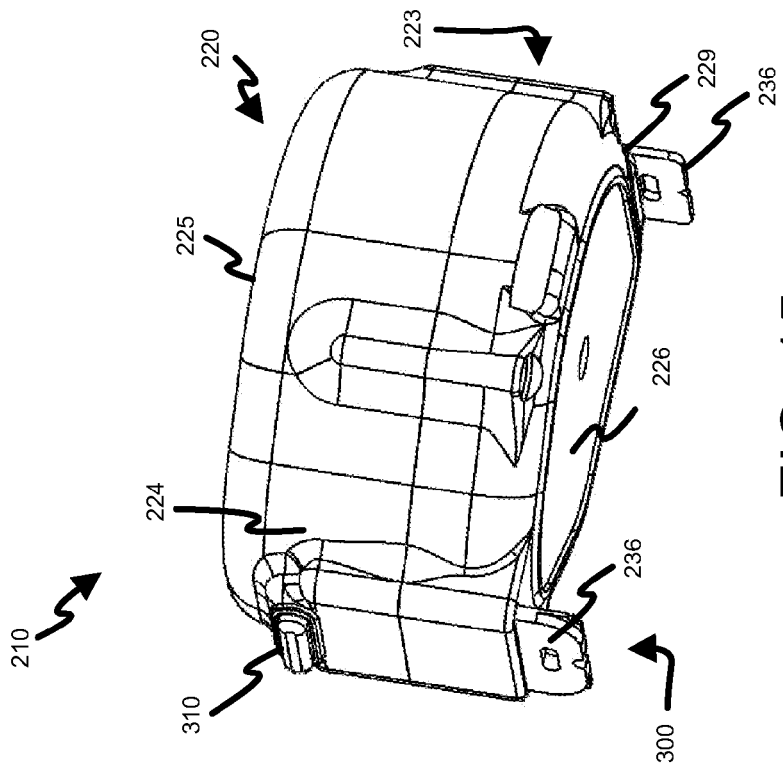
Figure 14:
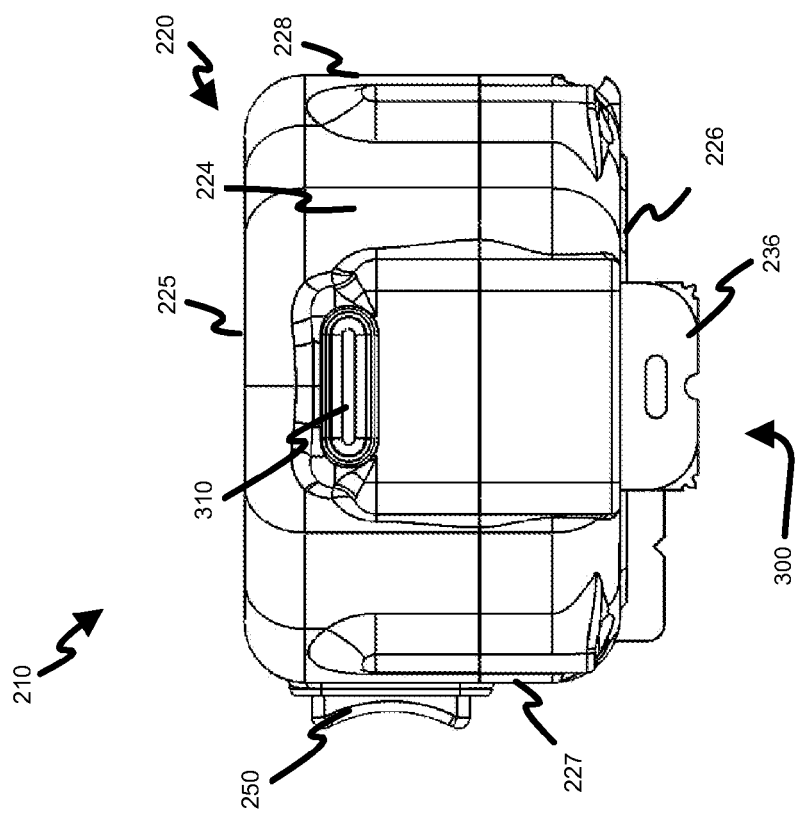

Referring now to FIGS. 12 and 13, the retractable tape measure 10 is shown with a securing assembly 140. As shown, the securing assembly 140 may include a retractable member in the form of a wired loop 142 that may be moved between a retracted position (e.g., FIG. 12) and an extended position (e.g., FIG. 13). The casing 20 may include a recess 143 and openings 144. The recess 123 may extend along a bottom, back edge 145 of the casing 20 thus forming a bottom surface 146 that is raised above the bottom side 26 of the casing 20. The raised bottom surface 146 permits a distal end 147 of the wire loop 142, when in the retracted position, to extend from the casing 20 but not into a plane defined by the bottom side 26 of the casing 20. However, when in the extended position, the distal end 147 may extend through the plane defined by the bottom side 26 and permit the back side 24 to be secured to an object via the wire loop 142.

As shown, the openings 144 may extend through the bottom surface 146 of the recess 143. Moreover, inner surfaces of the openings 144 may engage outer surfaces 148 of the wire loop 142 in a manner that permits the outer surfaces 148 to slide against the inner surfaces of the openings 144. In one embodiment, the openings 144 provide a friction-fit sufficient to prevent the wire loop 142 from sliding into the extended position of FIG. 13 due to gravity. The recess 143 may be large enough to permit a craftsperson to grab the distal end 147 of the wire loop 142 with their fingers and manually extend the wire loop 142. Moreover, a proximal end of the wire loop 142 may include stops that prevent the wire loop 102 from being over-extended and completely removed from the casing 20 as the craftsperson manually extends the wire loop 142. Similarly, the stops may prevent the wire loop 142 from being over-retracted and completely inserted into the casing 20 as the craftsperson manually retracts the wire loop 142 into the openings 144.

While the wire loop 142 in one embodiment may be manually retracted and extended, the wire loop 142 in another embodiment may be spring loaded. In particular, a craftsperson may push on the distal end 147 of the wire loop 142 to release a catch and permit an associated spring to move the wire loop 142 into the extended position. The craftsperson may latter push on the distal end 147 to cause the wire loop 142 to retract back into the openings 144 far enough to re-engage a catch and retain the wire loop 142 in the retracted position.

Referring now to FIGS. 14-19, an embodiment of a horizontal-reel, retractable tape measure 210 is shown. The tape measure 210 may include an outer casing or housing 220 defined by one or more outer walls 222. The walls 222 may generally define a front side 223, a back side 224, a top side 225, a bottom side 226, a left side 227, and a right side 228 of the retractable tape measure 210. The tape measure 210 may further include a measuring tape blade 230 that extends through a horizontal slot 229 in the front side 223 of the casing 220.

The blade 230 may comprise a long, narrow strip of metal or other flexible material. In particular, the blade 230, like blade 30 described above, may include a long length L (e.g., 25 feet), a narrow width W (e.g., 1 inch), and a minor thickness T (e.g., 0.1 millimeters) that define a major upper surface and a major lower surface of the blade 230. The blade 230, also like blade 30, may further include measurement markings on the upper surface, the lower surface, or both. The measurement markings may be spaced at regular intervals (e.g., every sixteenth of an inch) and may have associated labels to assist a craftsperson in obtaining a measurement reading.

The blade 230 may further include a hook or tab 236 that is attached to a distal end 238. A craftsperson may use the tab 236 to secure the distal end 238 of the blade 230 to an object to be measured. Moreover, the tab 236 may be dimensioned such that the tab 236 is too large to pass through the slot 229 in the front side 223 of the casing 220. Such dimensioning of the slot 229 and hook 236 ensures that a reel (described below) does not over-retract the distal end 238 of the blade 230 into an interior of the casing 220.

The retractable tape measure 210 may further include a vertical axle 240 and a tape reel 242 mounted on the vertical axle 240. As shown, the vertical axle 240 may extend centrally, between the top side 225 and bottom side 226 of the casing 220. The vertical axle 240 may further provide the tape reel 242 with a vertical axis of rotation that is normal to the top side 225 and the bottom side 226 of the casing 220.

The tape reel 242 may be generally shaped as a right, circular cylinder having a larger diameter D than height H. Moreover, the casing 220 may generally conform to the shape of the tape reel 242, resulting in the tape measure 210 likewise having a larger diameter than height. Conversely, the tape measures 10 of FIGS. 1-13 include a similarly shaped tape reel that is mounted to a horizontal axle that extends centrally, between a left side 27 and right side 28 of the tape measure 10. The tape measures 10 likewise include casings 20 that generally conform to the shape of their respective tape reels. As such, the ratio of surface area of the bottom side 226 of tape measure 210 to the surface area of its front, back, left, or right side is larger than the ratio of the surface area of the bottom side 26 of tape measure 10 to the surface area of its front, back left, or right side. The proportionally larger bottom side 226 and smaller height generally results in the tape measure 210 with a lower center of gravity and thus more stable and less likely to tip over during measurement than the tape measures 10 of FIGS. 1-13.

A proximal end of the blade 230 may be attached to the reel 242. A central portion 243 of the blade 230 may be wound around the reel 242. A distal end 238 of the blade 230 may extend through a horizontal slot 229 in the front side 223 of the casing 220. The slot 229 may be positioned in the front side 223 of the casing 220 toward the bottom side 226. The slot 229 may also be elongated such that a longitudinal axis of the slot 229 runs parallel or substantially parallel with the bottom side 226. Moreover, the measuring tape blade 230 may be directed through the slot 229 such that the width W of the blade 240, which is parallel with the vertical axle 240 when the blade 240 is wound around the reel 242, is twisted such that the width is perpendicular to the vertical axle 240 and thus parallel with the longitudinal axis of the slot 229 and the bottom side 226 of the casing 220. As a result, the blade 230 may extend through the slot 229 such that the measuring tape blade 230 generally extends along a plane defined by the bottom side 226 of the casing 220.

The tape measure 210 may further include a slide 250 that projects through the casing 220 to operate a brake. The brake, when actuated via slide 250, may engage the measuring tape blade 230, the reel 242, or both to maintain the blade 230 in an extended position. Conversely, when de-actuated via slide 250, the brake may permit a retraction force to be applied by the tape reel 242 to retract and recoil the blade 230. In one embodiment, the tape reel 242 has an associated spring or springs which apply the retraction force. However, in other embodiments, the reel 242 may be coupled to a handle of the tape measure 210. A craftsperson may use the handle to manually crank the reel 242 and retract and recoil the blade 240.

The tape measure 10 may further include a securing assembly 300 that is associated with the back side 224 of the casing 220. The securing assembly 300 may take many different forms such as those shown in FIGS. 2-13. However, the securing assembly 300, in one embodiment, may include a spring-loaded release button 310 and a spring-loaded, retractable member in the form of a tang 352. The spring-loaded release button 310 may include a button surface 312, legs 313, and catch 314. The legs 313 may extend perpendicularly from the button surface 312 through a button opening 261 in the casing 220. The catch 314 may run parallel to the button surface 312 and may join central portions of the legs 313. The catch 314 may further provide a spring mount 326 that may receive an associated spring 327 that applies a force that directs the spring-loaded button 310 outward from the casing 320.

Each leg 313 of the button 310 may include barbs 318 that are angled away from the end of the respective leg 313. In particular, the angled barbs 318 may engage catches in the casing 320 and compress the ends of legs 313 toward one another such that the barbed ends may pass by the catches when the release button 310 is initially inserted through the button opening 361 during manufacturing. After the barbs 318 pass by the catches, the legs 313 may return to the position depicted in FIG. 18. The barbs 318 may then engage the catches and prevent the associated spring 327 from expelling the release button 310 from the button opening 361. Due to the above arrangement, a user may press the button surface 312 to move the button 310 in an inward direction and the spring 327 may move the button 310 in an outward direction when the user ceases to press the button surface 312.

As depicted in FIGS. 16 and 17, the securing assembly 300 may further include a vertical channel 336 that is integrated into the back side 224 of the casing 220. As shown in FIG. 16, the vertical channel 336 may completely receive a tang 352 when the tang 352 is in a retracted position. The channel 336 may further guide the tang 352 as associated spring 353 forces the tang 352 to move from the retracted position of FIG. 16 to the extended position of FIG. 17 after actuating the release button 310. Similarly, the channel 336 may guide the tang 352 into the retracted position of FIG. 16 when a craftsperson applies sufficient force to the extended tang 352 to overcome the springs 353.

As shown in FIG. 19, the tang 352 may further include a latch 360 that extends from a proximal end 362 of the tang 352. Moreover, the proximal end 362 may provide a seat or surface 364 against which springs 353 may exert a downward force. In one embodiment, the securing assembly 300 includes two springs 353, which each extend along opposite sides of the latch 360.

As shown in FIGS. 16 and 17, the latch 360 may include a hook 364. The hook 364 is configured to engage and grasp the catch 314 of the button 310 when the tang 352 is in the retracted position. As depicted in FIGS. 16 and 17, a bottom surface of the catch 314 may be angled in order to help guide the hook 364 past the catch 314 when the tang 352 is being retracted. Once past the catch 314, the hook 364 may engage an upper surface of the catch 314 and retain the tang 352 in the retracted position as shown in FIG. 16. To release the tang 352, a craftsperson may press the button 310 thus causing the catch 314 to slide past the hook 364, thus releasing the latch 360 and permitting the springs 357 to move the tang 352 into the retracted position.

Besides the latch 360, the tang 352 may further include one or more integrated marking devices 354. As depicted in FIG. 19, a distal end 376 of the tang 352 may integrate a marking device 378 into each corner 379. For example, each corner 379 may be sharpened to permit marking an object by scratching or scoring a surface of the object. In another embodiment, each corner 379 may include a roller comprised of or covered with a marking compound such as graphite that may be used to mark a surface of an object.

Alternatively or additionally, the rollers may be knurled so as to score a surface of the object.

Another securing assembly 400 for a tape measure 410 is shown in FIGS. 20-23. While the tape measure 410 is depicted in FIGS. 20-23 as a vertical-reel, tape measure similar to the tape measure 10 of FIGS. 1-13, the securing assembly 400 is further suitable for a horizontal-reel, tape measure similar to the tape measure 210 shown in FIGS. 14-19.

Figure 23:
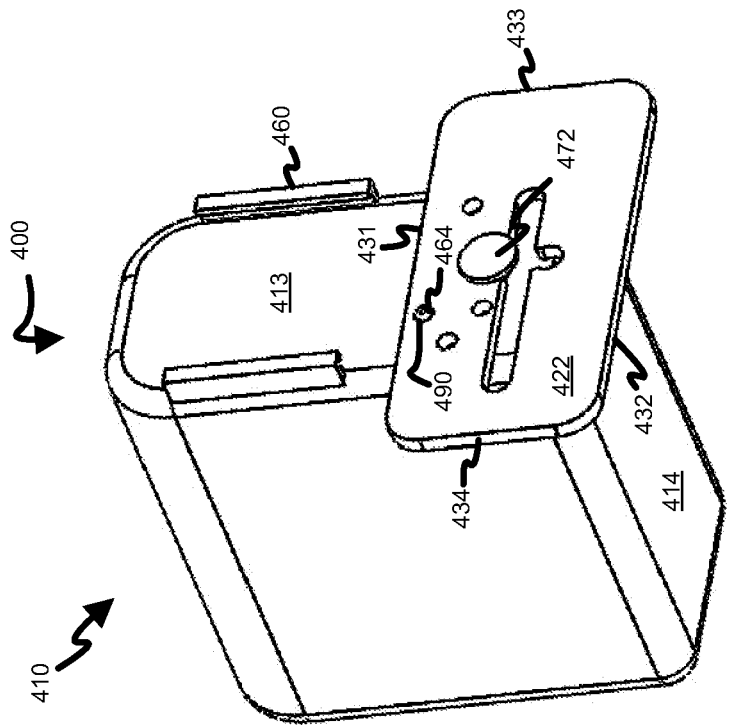

The securing assembly 400 may include a retractable member in the form of a tang 420. The tang 420 may be attached to a back side 413 of the tape measure 410 via rails 460, fixed pivot 470, and spring-loaded detent 490. The tang 420 generally comprises a thin, metal plate 422. However, the plate 422 may be made of other rigid and sturdy materials. As depicted, the plate 422 has a generally-rectangular perimeter and a narrow thickness which define a front face and back face of the tang 420. For the convenience of discussion, the plate 422 is described as having a left edge 431, a right edge 432, a top edge 433, and a bottom edge 434 which correspond to a left, right, top, bottom edge of the plate 422 when the plate 422 is in the retracted position 420 of FIG. 20. The plate 422, however, may be rotated about fixed pivot 470 during operating thus resulting in sides of the plate 422 no longer aligning with the viewer's perspective of left, right, top, and bottom. For example, the plate 422, in FIGS. 22 and 23, is rotated 90° with respect to the plate 422, in FIGS. 20 and 21. As such, the top edge 423 is depicted toward the viewer's right in FIGS. 22 and 23.

Figure 21:
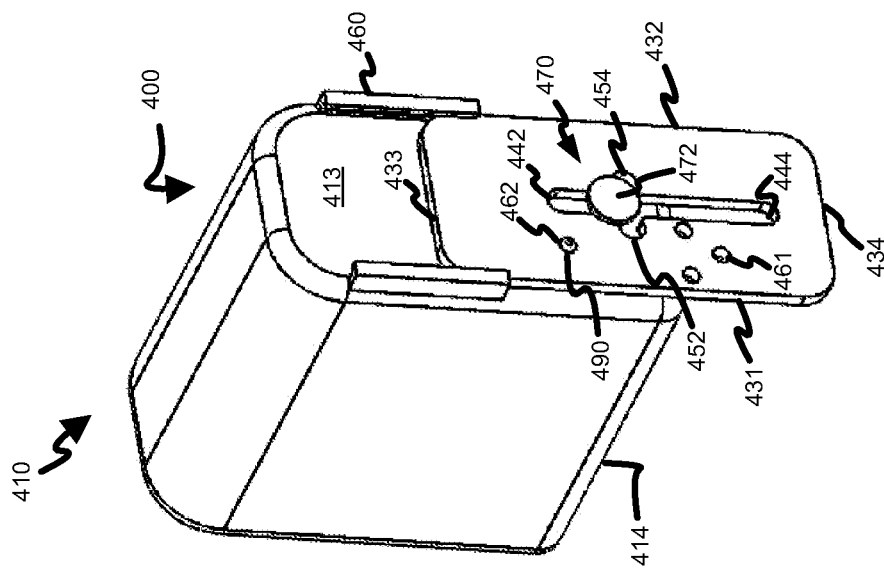
FIGS. 20-23 show a securing and stabilizing assembly for a tape measure.
Figure 20:
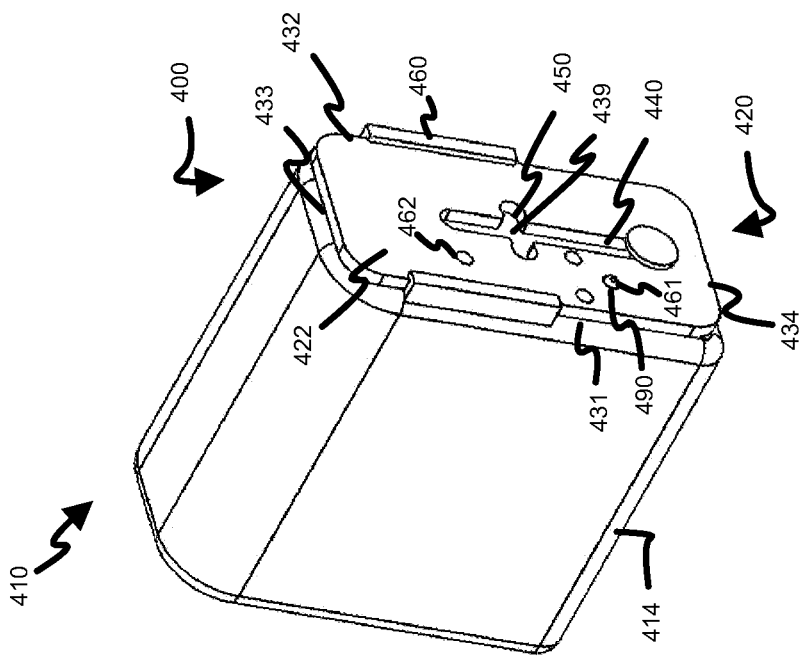
Figure 22:
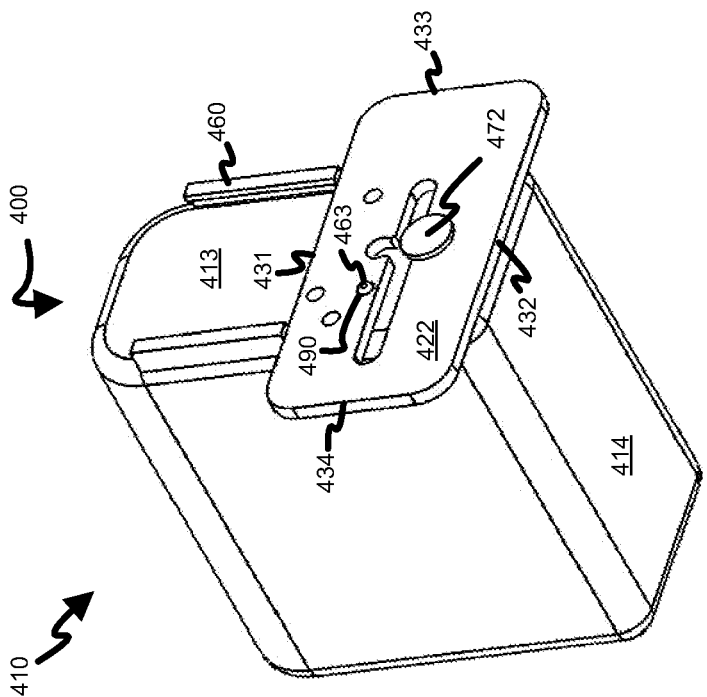

Referring to FIGS. 20 and 21, the plate 422 may include a longitudinal track 440 and a lateral track 450 that crosses the longitudinal track 440 at a central point 439. The longitudinal track 440 may provide a fixed-width opening that extends through the plate 422 and runs in a longitudinal direction across the plate 422. In particular, the longitudinal track 440 may run from a central point 439 of the plate 422 to an upper endpoint 442 toward the top edge 433. The longitudinal track 440 may further run from the central point 439 to a lower end point 444 toward the bottom edge 434.

Similarly, the lateral track 450 may provide a fixed-width opening that extends through the plate 422, but runs in a lateral direction across the plate 422. In particular, the lateral track 450 may run from the central point 439 toward a left endpoint 452 toward the left edge 431. The lateral track 430 may further run from the central point 439 to a right endpoint 454 toward the right edge 432.

In one embodiment, the tracks 440, 450 generally provide the fixed pivot 470 a straight path between the respective endpoints. Moreover, the fixed-width of the openings provided by the tracks 440, 450 are the same and are sized to correspond to a diameter of the fixed pivot 470.

The fixed pivot 470 may include a head 472 and cylindrical body. In particular, the cylindrical pivot body may have diameter that permits the body to pass through the openings provided by tracks 440, 450 and attach the pivot 470 to a back side 413 of the tape measure 410. In some embodiments, the diameter of the pivot body closely matches the width of the tracks 440, 450 and the diameter of the pivot head 472 exceeds the width of the tracks 440, 450. The pivot body may therefore engage the tracks 440, 450 and permit the fixed pivot 470 to slide along the tracks 440, 450, while the pivot head 472 slides along a front face of the plate 422 and helps retain the plate 422 to the back side 413 of the tape measure 410.

The plate 422 may further include retention holes 461, 462, 463, and 464. Each of the retention holes 461-464 may be sized to receive the spring-loaded detent 490 that extends from the back side 413 of the tape measure 410. In one embodiment, the spring-loaded detent 490 is positioned toward the lower, left of the back side 413. The spring-loaded detent 490 may be positioned at other locations of the back side 413. As will become apparent from FIGS. 20-23, the spring-loaded detent 490 is generally positioned offset from the tracks 440, 450 to avoid engaging the tracks 440, 450 during movement of the tang 420 from one desired position to another. Moreover, the detent 490 is positioned such that the detent 490 can engage the tang 420 in each of the desired positions of FIGS. 20-23 when the detent 490 is extended. Since, the wide, extended position of FIG. 23 is the lowest desired position in one embodiment, the detent 490 in such an embodiment is positioned low enough on the back side 413 that the detent 490 still engages the tang 420 as shown in FIG. 23.

As noted above, the tracks 440, 450 have endpoints 442, 444, 452, and 454 and the fixed pivot 470 may travel along the tracks 440, 450 between the various endpoints 443, 444, 452, 454. In one embodiment, each of the endpoints 442, 444, 452, and 454 generally corresponds to a final destination for the fixed pivot 470 when the tang 420 is placed in one of the desired positions. More specifically, FIG. 20 depicts the tang 420 in a retracted position where the tang 420 does not extend into a plane defined by a bottom side 414 of the tape measure 410. Moreover, when in the retracted position, the fixed pivot 470 is generally aligned with the lower endpoint 444 of track 440 and the detent 490 is engaged with the retention hole 461.

FIG. 21 depicts the tang 420 in an extended position where the tang 420 extends through the plane defined by a plane defined by a bottom side 414 of the tape measure 410, thus permitting the tang 420 to secure the tape measure 410 to an object being measured. Moreover, when in the normal, extended position of FIG. 21, the fixed pivot 470 is near the upper endpoint 442 of track 440 and the detent 490 is engaged with the retention hole 462. Since the fixed pivot 470 follows the longitudinal track 440 when the tang 420 moves from the retracted position of FIG. 20 to the normal, extended position of FIG. 21, the retention holes 461, 462 define endpoints along a line that generally parallels the track 440.

FIG. 22 depicts the tang 420 in a stabilizing position where the tang 420 does not extend through the plane defined by a plane defined by a bottom side 414. Instead, the right side 432 of the tang 420 is aligned with the bottom side 414 of the tape measure. In this position, the tang 420 effectively laterally extends the bottom side 414 of the tape measure 410, thus providing additional lateral support. Moreover, the fixed pivot 470 generally aligns with the right endpoint 454 of track 450 and the detent 490 is engaged with the retention hole 463. Thus, the right endpoint 454, in one embodiment is positioned in the plate 422, such that the distance between the right endpoint 454 and the first side 432 of the plate 422 equals the distance between the fixed pivot 470 and the bottom side 414 of the tape measure 410.

FIG. 23 depicts the tang 420 in a wide, extended position where the tang 420 extends through the plane defined by the bottom side 414 of the tape measure 410. Moreover, the tang 420 is rotated such that the top edge 434 and bottom edge 434 of the tang 420 extend beyond the sides of the tape measure 410. In this position, the tang 420 may be secured to an object being measured. Moreover, the tang 420 may also provide additional lateral support to help prevent the tape measure 410 from tipping over during use.

As shown, the fixed pivot 470 generally aligns with the left endpoint 452 of track 450 and the detent 490 is engaged with the retention hole 464. Since the fixed pivot 470 generally follows the lateral track 450 when the tang 420 moves from the stabilizing position of FIG. 22 to the wide, extended position of FIG. 23, the retention holes 463, 464 define endpoints of a line that generally parallels the track 450.

As shown in FIGS. 20 and 21, the rails 460 may include grooves or channels that generally receive the tang 420 when the tang 420 is in the retracted and normal, extended positions. By receiving the tang 420, the rails 460 provide the tang 420 with additional structural support and stability. However, such receiving also prevent rotation of the tang 420 when in the retracted and normal, extended positions.

As shown in FIG. 21, the longitudinal track 440 extends beyond the fixed pivot 470 to the upper endpoint 442 when in the normal, extended position. As a result of further extending the track 440, the tang 420 may extend beyond the extended position of FIG. 21 until the fixed pivot 470 reaches the upper endpoint 442. In one embodiment, the rails 460 extend roughly only half way down the back side 414. Moreover, the upper endpoint 442 is positioned on the tang 420 such that tang 420 is free of the rails 460 when the fixed pivot 470 reaches the upper endpoint 442. Thus, with the fixed pivot 470 aligned with the upper endpoint 442, the tang 420 may be rotated clockwise to permit positioning the tang 420 into the stabilizing or wide, extended positions of FIGS. 22 and 23.

Figure 25:
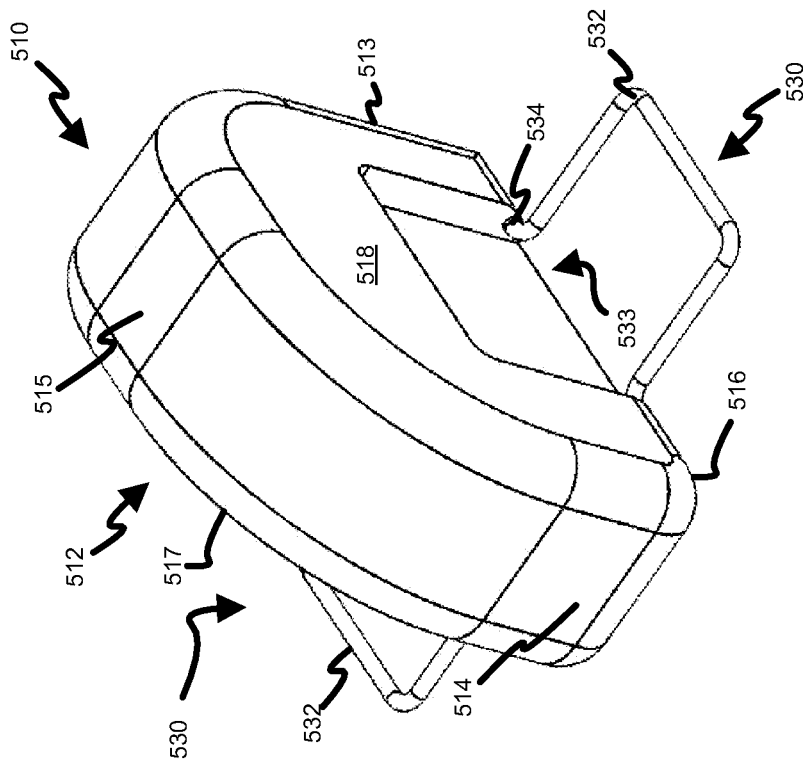
FIGS. 24-25 show a stabilizing assembly for a tape measure.
Figure 24:
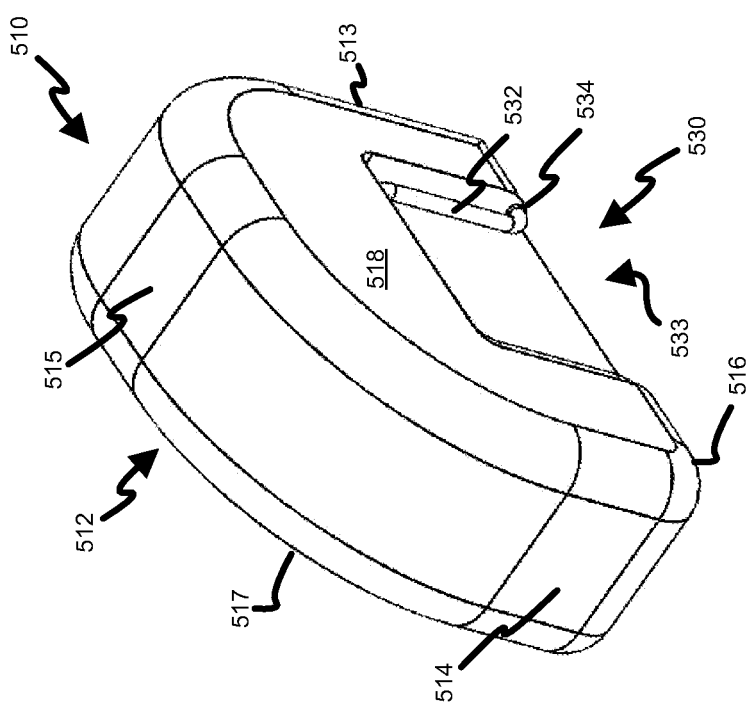

While FIGS. 21-23 depict one manner of stabilizing a tape measure via a retractable member such as back tang 420, FIGS. 24 and 25 depict another manner of stabilizing a tape measure 510. While the tape measure 510 is depicted in FIGS. 24 and 25 as a vertical-reel, tape measure similar to the tape measures of FIGS. 1-13 and 21-23, the depicted stabilizing assembly 530 may also be suitable for horizontal-reel, tape measures similar to the tape measure 210 shown in FIGS. 14-19.

As depicted, the tape measure 510 may include an outer casing or housing 512 that generally defines a front side 513, a back side 514, a top side 515, a bottom side 516, a left side 517, and a right side 518 of the tape measure 10. The tape measure 510 may further include stabilizing assemblies 530 associated with the left side 517 and right side 518 of the tape measure 510.

The stabilizing assembly 530 may include a stabilizer 532 which take various forms. As depicted, the stabilizer may comprise a wired loop that may be pivoted between a retracted position (e.g., FIG. 24) and an extended position (e.g., FIG. 25). However, the stabilizer 532, in other embodiments, may comprise a tab, lever, tang, or some other projection that may be moved between retracted and extended positions.

As shown, the casing 512 may include a recess 533 in the right side 518. The left side 517 may include a similar recess. The recess 533 may extend upward from a bottom edge of the casing 512 and be sized to receive the stabilizer 523. The stabilizer 532 and the right side 518 may form a pivotal coupling 534 toward a bottom edge of the casing 512. In one embodiment, the pivotal coupling 534 provides a friction-fit sufficient to retain the stabilizer 532 in the retracted position in the presence of gravity. Moreover, the pivotal coupling 534 may include stops that prevent the stabilizer 532 from pivoting beyond a plane defined by a bottom side 516 of the tape measure 510. The pivotal coupling 534 may further include detents, latches, or other holding devices configured to retain the stabilizer 532 in the extended position of FIG. 25. While in the extended position, the stabilizers 532 may effectively increase the operating width of the tape measure 510 and therefore may provide the tape measure 510 with additional lateral support. Such additional lateral support may help prevent the tape measure 510 from tipping over during use.

Various embodiments of the invention have been described herein by way of example and not by way of limitation in the accompanying figures. In particular, various stabilizing assemblies and securing assemblies have been described which help stabilize and secure a tape measure being used to measure an object. Moreover, it should be appreciated that a craftsperson may enjoy the benefits of the above described stabilizing assemblies and securing assemblies without the aid of an external tool. In particular, the craftsperson does not need to use a screw driver, wrench, or other device in order to use the above stabilizing assemblies and securing assemblies. As such, the craftsperson may quickly and easily secure and stabilize the tape measure without the hassle of using a separate tool to actuate the securing or stabilizing assemblies.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment or embodiments disclosed, but that the present invention encompasses all embodiments falling within the scope of the appended claims.

What is claimed is:

1. A tape measure, comprising:
    a casing including a front side, a back side opposite the front side, a top side, and a bottom side opposite the top side;
    a reel mounted in the casing; and
    a measuring tape blade wound around the reel, the measuring tape blade comprising a distal end that extends through a slot in the front side of the casing;
    wherein a side of the casing includes a securing assembly having a retractable member;
    wherein the securing assembly permits moving the retractable member between an extended position and a retracted position without the aid of a separate tool;
    wherein a proximal end of the retractable member includes a tab that extends through a slot in the casing; and
    wherein the tab is configured to force the retractable member into the extended position in response to a force applied to the tab.

2. The tape measure of claim 1, wherein the retractable member, when in the extended position, extends through a plane defined by the bottom side of the casing, and, when in the retracted position, does not extend through the plane defined by the bottom side of the casing.

3. The tape measure of claim 1, wherein the securing assembly is configured to retain the retractable member in the retracted position.

4. The tape measure of claim 1, wherein the securing assembly comprises a friction-fit that exerts a force upon the retractable member that is sufficient to retain the retractable member in the retracted position.

5. The tape measure of claim 1, wherein the securing assembly includes a stop that prevents the retractable member from being over-extended.

6. The tape measure of claim 1, wherein the securing assembly includes a stop that prevents the retractable member from being over-retracted.

7. A tape measure, comprising:
a casing including a front side, a back side opposite the front side, a top side, and a bottom side opposite the top side;
a reel mounted in the casing; and
a measuring tape blade wound around the reel, the measuring tape blade comprising a distal end that extends through a slot in the front side of the casing;
wherein a side of the casing includes a securing assembly having a retractable member;
wherein the securing assembly permits moving the retractable member between an extended position and a retracted position without the aid of a separate tool; and
wherein the securing assembly includes a spring-loaded release button configured to release the retractable member from the retracted position.

8. The tape measure of claim 7, wherein the securing assembly includes a spring configured to move the retractable member into the extended position in response to the spring-loaded release button releasing the retractable member.

9. A tape measure, comprising:
a casing including a front side, a back side opposite the front side, a top side, and a bottom side opposite the top side;
a reel mounted in the casing; and
a measuring tape blade wound around the reel, the measuring tape blade comprising a distal end that extends through a slot in the front side of the casing;
wherein a side of the casing includes a securing assembly having a retractable member;
wherein the securing assembly permits moving the retractable member between an extended position and a retracted position without the aid of a separate tool; and
wherein the securing assembly includes a recess defining a bottom surface above the bottom side of the casing.

10. The tape measure of claim 9, wherein, when in a retracted position, a distal end of the retractable member extends beyond the bottom surface of the recess but not into a plane defined by the bottom side of the casing.

11. The tape measure of claim 10, wherein the securing assembly retains the retractable member in the retracted position, but permits the retractable member to be moved into the extended position via a force applied to the distal end of the retractable member.

12. The tape measure of claim 10, wherein:
the securing assembly includes a spring and a catch;
the catch is configured to retain the retractable member in the retracted position;
the catch is configured to release the retractable member in response to a force applied to the distal end of the retractable member; and
the spring is configured to move the retractable member into the extended position in response to the catch releasing the retractable member.

13. A tape measure, comprising:
a casing including a front side, a back side opposite the front side, a top side, and a bottom side opposite the top side;
a reel mounted in the casing; and
a measuring tape blade wound around the reel, the measuring tape blade comprising a distal end that extends through a slot in the front side of the casing;
wherein a side of the casing includes a securing assembly having a retractable member;
wherein the securing assembly permits moving the retractable member between an extended position and a retracted position without the aid of a separate tool;
wherein the securing assembly further comprises a pivotal coupling associated with a proximal end of the retractable member;
wherein the pivotal coupling defines an axis of rotation for the retractable member; and
wherein the pivotal coupling permits rotating the retractable member about the axis of rotation between the retracted position and the extended position.

14. A tape measure, comprising:
a casing including a front side, a back side opposite the front side, a top side, and a bottom side opposite the top side;
a reel mounted in the casing; and
a measuring tape blade wound around the reel, the measuring tape blade comprising a distal end that extends through a slot in the front side of the casing;
wherein a side of the casing includes a securing assembly having a retractable member;
wherein the securing assembly permits moving the retractable member between an extended position and a retracted position without the aid of a separate tool;
wherein the retractable member comprises a first track that runs from a central point to an upper endpoint and from the central point to a lower endpoint;
wherein the securing member includes a fixed pivot having a body and a head that is wider than a width of the first track;
wherein the body extends through the first track and into the casing; and
wherein the head engages a surface of the retractable member to retain the retractable member to the casing while permitting the retractable member to be moved between the retracted position and the extended position.

15. The tape measure of claim 14, wherein:
the retractable member further comprises a second track that crosses the first track at the central point;
the second track has the width of the first track and runs from the central point to a first endpoint and from the central point to a second endpoint; and
the fixed pivot permits rotating the retractable member such that a top edge and a bottom edge to the retractable member extend beyond a left side and right side of the tape measure to provide additional lateral support.

16. The tape measure of claim 15, wherein the retractable member extends through a plane defined by the bottom side of the casing when the head of the fixed pivot aligns with the first endpoint.

17. The tape measure of claim 16, wherein the retractable member aligns with the plane defined by the bottom side of the casing when the head of the fixed pivot aligns with the second endpoint.

18. The tape measure of claim 15, wherein:
the retractable member comprises a plurality of defined positions associated with the endpoints of the first and second tracks;
the retractable member comprises a separate retaining hole for each of the plurality of defined positions;

the securing assembly further includes a spring-loaded detent that extends from the casing; and the spring-loaded detent is configured to engage a respective retaining hole in response to the retractable member being moved per the first and second tracks into a corresponding defined position.

19. A tape measure, comprising:

a casing including a front side, a back side opposite the front side, a top side, and a bottom side opposite the top side;

a reel mounted in the casing; and a measuring tape blade wound around the reel, the measuring tape blade comprising a distal end that extends through a slot in the front side of the casing;

a first stabilizing assembly associated with a right side of the casing; and a second stabilizing assembly associated with a left side of the casing;

wherein a side of the casing includes a securing assembly having a retractable member;

wherein the securing assembly permits moving the retractable member between an extended position and a retracted position without the aid of a separate tool;

wherein the first stabilizing assembly comprises a first retractable stabilizer movable between a retracted position and an extended position;

wherein the second stabilizing assembly comprises a second retractable stabilizer movable between a retracted position and an extended position; and wherein the first retractable stabilizer and the second retractable stabilizer are each configured to effectively increase a bottom surface of the tape measure when in the extended position.

* * * * *